(12) United States Patent
Baset et al.

(10) Patent No.: US 9,692,653 B1
(45) Date of Patent: Jun. 27, 2017

(54) AUTOMATIC GENERATION OF VALIDATORS TO VALIDATE DEPLOYMENT CODE USED FOR CONFIGURING SERVERS

(71) Applicant: INTERNATIONAL BUSINESS MACHINES CORPORATION, Armonk, NY (US)

(72) Inventors: Salman A. Baset, New York, NY (US); Kirk A. Beaty, Goldens Bridge, NY (US); Nilton T. Bila, White Plains, NY (US); Byung Chul Tak, Peekskill, NY (US); Long Wang, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/973,032

(22) Filed: Dec. 17, 2015

(51) Int. Cl.
*G06F 9/44* (2006.01)
*H04L 12/24* (2006.01)
*G06F 11/36* (2006.01)
*G06F 9/445* (2006.01)

(52) U.S. Cl.
CPC ............ *H04L 41/0869* (2013.01); *G06F 8/60* (2013.01); *G06F 11/3616* (2013.01); *G06F 11/3684* (2013.01); *H04L 41/0886* (2013.01)

(58) Field of Classification Search
None
See application file for complete search history.

(56) References Cited

U.S. PATENT DOCUMENTS

7,886,041 B2   2/2011   Outhred et al.
7,984,515 B1   7/2011   Patsenker et al.
8,627,311 B2   1/2014   Auer

*Primary Examiner* — Philip Wang
(74) *Attorney, Agent, or Firm* — F. Chau & Associates, LLC (57) ABSTRACT

A validation system is configured to automatically generate validators for one or more target systems. The validation system includes: a memory storing a computer process, a network interface configured to interface with the one or more target systems over a computer network, and a processor executing the computer process. The computer process is configured to parse the deployment code to identify components in deployment code, generate validator code for each identified component, and use the network interface to transmit the validator codes to the one or more target systems.

20 Claims, 7 Drawing Sheets

| Well-known component | Parsing rules |
|---|---|
| directories | Directory parsing rule |
| files | File parsing rule |
| User IDs | User Id parsing rule |
| Ports | Port parsing rule |
| Network addresses | network address parsing rule |

FIG. 6

610 default["apache"]["dir"]      = "/etc/apache2"
default["redis"]["data_dir"] = "/var/lib/redis"
default["redis"]["log_dir"] = "/var/log/redis"

620 default["redis"]["user"] = "redis"

630 default["redis"]["port"] = 6379
default["apache"]["listen_ports"] = ["80","443"]

640 default["redis"]["bind"] = "127.0.0.1"

AUTOMATIC GENERATION OF VALIDATORS TO VALIDATE DEPLOYMENT CODE USED FOR CONFIGURING SERVERS

BACKGROUND

The present invention relates to the field of computer server configuration and maintenance, and more particularly to software used to validate the deployment code used to configure a computer server.

Server provisioning is a set of actions to prepare a server with appropriate systems, data, and software, and make it ready for network operation. Typical tasks when provisioning a server include: selecting a server from a pool of available servers, loading the appropriate software (e.g., operating system (OS), device drivers, middleware, and applications), appropriately customize and configure the system and the software to create or change a boot image for this server, and then change its parameters (e.g., internet protocol (IP) address, passwords, user accounts, etc). Since manual server provisioning can introduce errors and inconsistencies, software can be used to automate this process.

However, automated deployments of multi-tiered applications lack a comprehensive ability to: determine if a deployment succeeded, determine whether deployment is working correctly during steady state, or accurately diagnose which attributes or configurations are responsible for the failures of deployment or failure during steady-state operation. As a result, the system administrator of a cloud has to spend a lot of effort on verifying whether deployment succeeded by writing custom verification code. However, the verification code may not cover all the configurations that are deployed.

SUMMARY

According to an exemplary embodiment of the invention, a validation system is configured to automatically generate validators for one or more target systems. The validation system includes: a memory storing a computer process, a network interface configured to interface with the one or more target systems over a computer network, and a processor executing the computer process. The computer process is configured to parse the deployment code to identify components in deployment code, generate validator code for each identified component, and use the network interface to transmit the validator codes to the one or more target systems. The process may be configured to identify an order of execution of the validator codes.

According to an exemplary embodiment of the invention, a method of automatically generating validators for one or more target systems is provided. The method includes: parsing deployment code to identify components in the deployment code; generating validator code for each identified component; transmitting the generated validator codes to the one or more target systems; and executing the transmitted validator codes. The method may further include identifying an order of execution of the validator codes.

According to an exemplary embodiment of the invention, a computer program product for validating deployment code that is to be deployed on a target system is provided. The computer program product includes a computer readable storage medium having program code embodied therewith, and the program code is executable by a processor to perform method steps including instructions for: parsing the deployment code to identify components in the deployment code; generating validator code for each identified component; transmitting the generated validator codes to the target system; and executing the transmitted validator codes. The method steps may further include identifying an order of execution of the validator codes, wherein the executing occurs in the identified order.

BRIEF DESCRIPTION OF THE SEVERAL VIEWS OF THE DRAWINGS

Through the more detailed description of some embodiments of the present disclosure in the accompanying drawings, features of the present disclosure will become more apparent, wherein.

DETAILED DESCRIPTION

The inventive concept will be described in more detail with reference to the accompanying drawings, where exemplary embodiments of the present disclosure have been illustrated. Throughout the drawings, same or like reference numerals are used to represent the same or like components. However, the present inventive concept can be implemented in various manners, and thus should not be construed to be limited to the embodiments disclosed herein. On the contrary, those embodiments are provided for the thorough and complete understanding of the present disclosure to convey the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Figure 1:
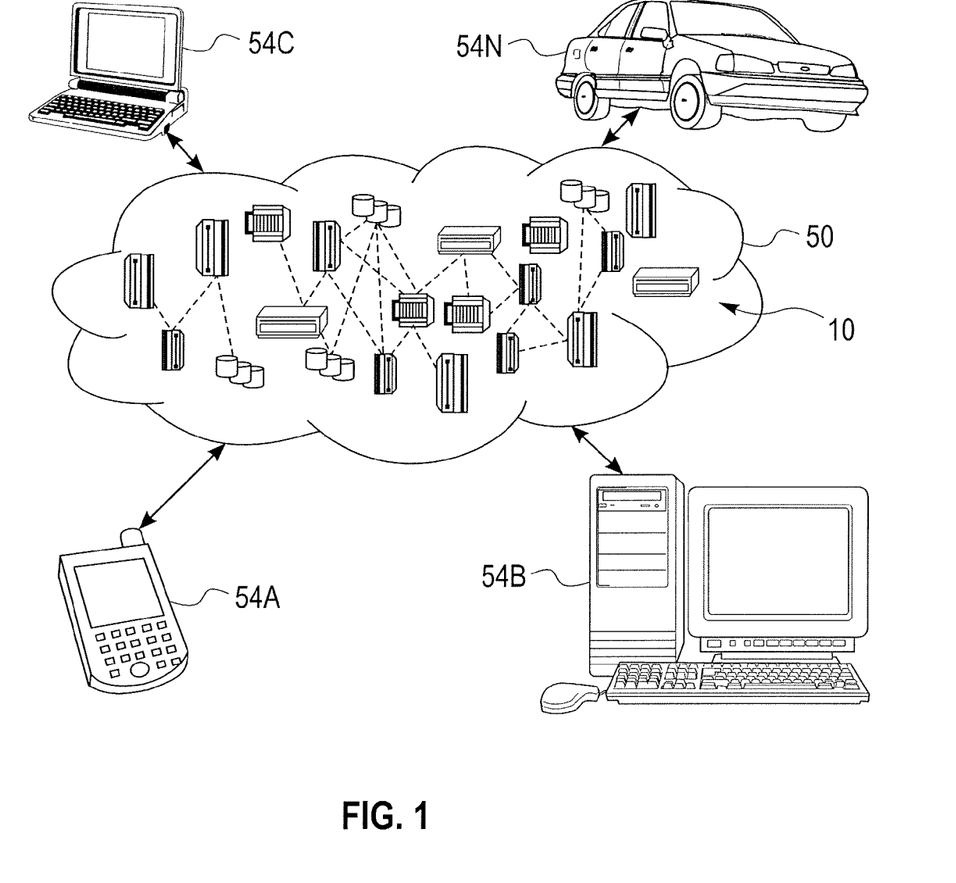
FIG. 1 illustrates a cloud computing environment according to an embodiment of the present invention.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes. Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
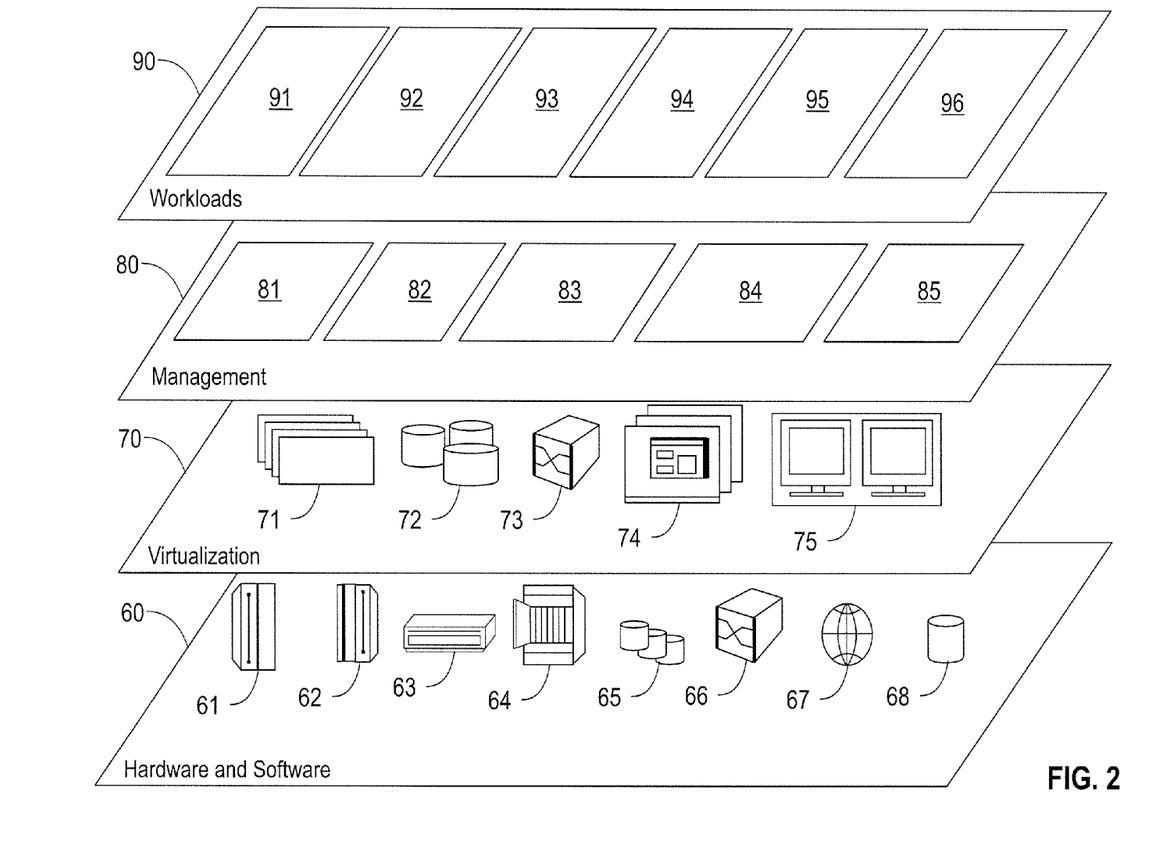
FIG. 2 depicts abstraction model layers according to an embodiment of the present invention, which may be used to implement a validator processing unit.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a validator processing unit 96.

The validator processing unit 96 will be discussed in more detail below with respect to FIG. 4. Please note that while the validator processing unit 96 is described as being stored within the cloud, the inventive concept is not limited thereto. For example, the validator processing unit 96 can be stored outside the cloud in a local server.

Figure 3:
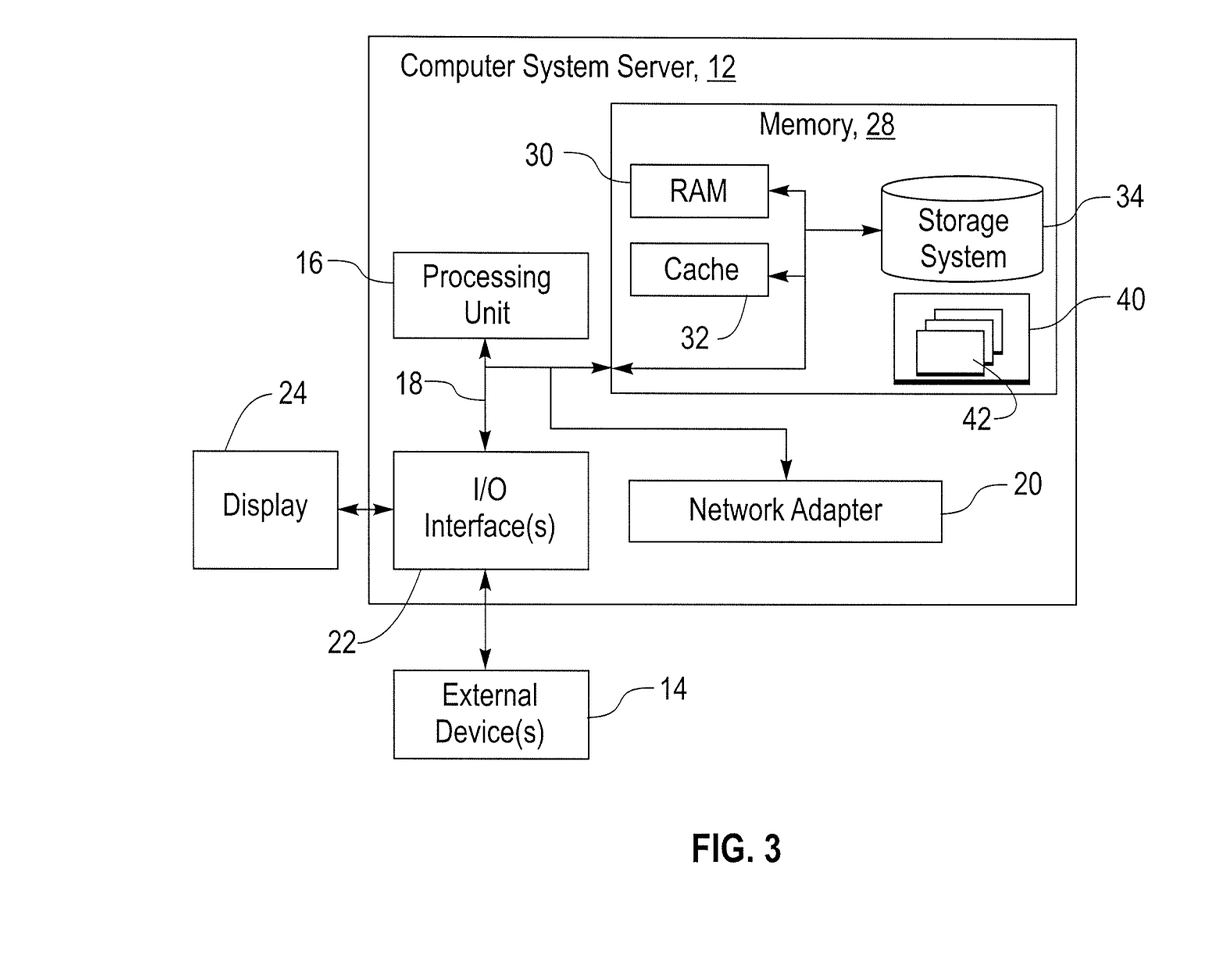
FIG. 3 shows an exemplary computer system, in which the validator processing unit may reside.

FIG. 3 illustrates an embodiment of a computer server that may be used to implement part of computing devices 54A-54N, which is applicable to implementing embodiments of the present invention. Computer system/server 12 is only illustrative and is not intended to suggest any limitation as to the scope of use or functionality of embodiments of the invention described herein.

As shown in FIG. 3, the computer system/server 12 is shown in the form of a general-purpose computing device. The components of the computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

The computer system/server 12 may include a variety of computer system readable media. Such media may be any available media that is accessible by the computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/non-volatile computer system storage media. By way of example, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

A program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. The computer system/server 12 can communicate with one or more networks such as a local area network (LAN), a general wide area network (WAN), and/or a public network (e.g., the Internet) via a network adapter 20. As depicted, the network adapter 20 communicates with the other components of computer system/server 12 via the bus 18. It should be understood that although not shown, other hardware and/or software components could be used in conjunction with the computer system/server 12. Examples of these other hardware and/or software components include, but are not limited to: microcode, device drivers, redundant processing units, external disk drive arrays, RAID systems, tape drives, and data archival storage systems.

Figure 4:
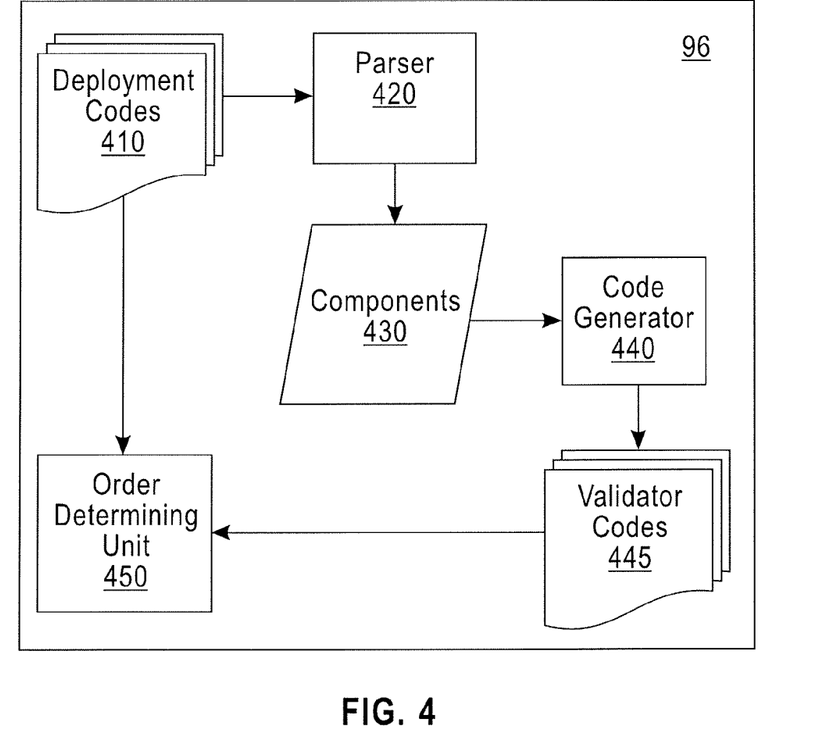
FIG. 4 shows an architecture of the validator processing unit according to an exemplary embodiment of the present invention.
Figure 5:
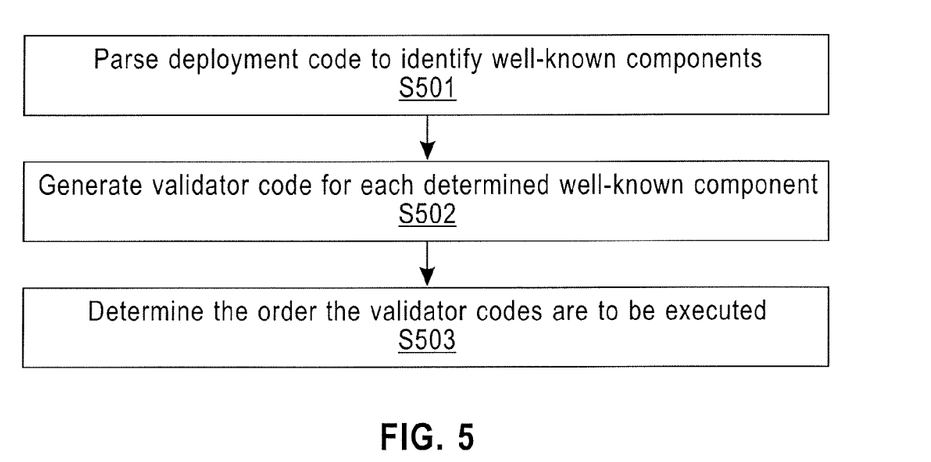
FIG. 5 show a method of operating the validator processing unit according to an exemplary embodiment of the invention.

FIG. 4 illustrates the validator processing unit 96 according to an exemplary embodiment of the invention. FIG. 5 illustrates of a method of operating the validator processing unit 96 according to an exemplary embodiment of the invention. Referring to FIG. 4, the validator processing unit includes a parser 420, a code generator 440, and an order determining unit 450.

The parser 420 parses deployment code 410 used to configure one or more computer servers (e.g., a target system) to identify well-known components 430 within the deployment code (S501). Examples of the deployment code include code written in configuration management tools such as CHEF, PUPPET, ANSIBLE. Examples of individuals that write deployment code include a MYSQL developer, a Cloud administrator, or a person contributing deployment code to CHEF, PUPPET, or ANSIBLE repositories etc. The deployment code 410 deploys one or more components and may read information about a specific deployment environment for correct deployment.

CHEF is a configuration management tool written in the RUBY programming language and the ERLANG programming language. The RUBY programming language is a domain-specific language (DSL) for writing system configuration "recipes". CHEF is used to streamline the task of configuring and maintaining a company's servers and can integrate with various cloud-based platforms. In CHEF, a user writes "recipes" that describe how CHEF manages server applications and utilities (e.g., an APACHE HTTP Server, MySQL, HADOOP, etc.) and how they are to be configured. These recipes (which can be grouped together as a "cookbook" for easier management) describe a series of resources that should be in a particular state.

The parser 420 is a software component that takes input data (e.g., deployment code 410) and builds a data structure (e.g., a parse tree, abstract syntax tree, or other hierarchical structure) giving a structural representation of the input. The parsing performed by the parser 420 may create tokens representative of the well-known components from sequences of input characters within the deployment code 410.

Figure 6:
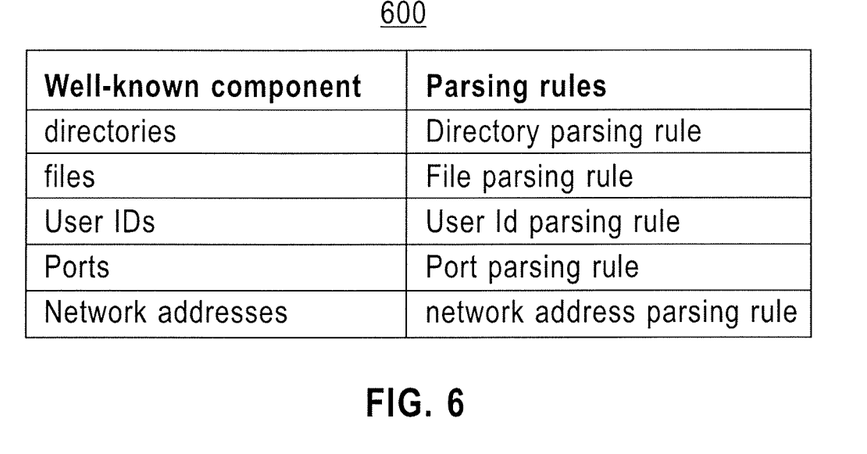
FIG. 6 illustrates an exemplary table that may be used by the validator processing unit.

Examples of the well-known components include a file, a directory, a user identifier (ID), a port, network addresses (e.g., an internet protocol (IP) address, a gate address, etc.), passwords, etc. In an embodiment where the well-known component is the network address, the network address includes an IP address, a port, and the type of internet protocol (e.g., TCP, UDP, HTTP, etc). FIG. 6 illustrates an example of a table 600 including a plurality of entries, where each entry identifies a different well-known component and a corresponding parsing rule that may be used by the parser 420 to parse for the corresponding well-known component.

Figure 7:
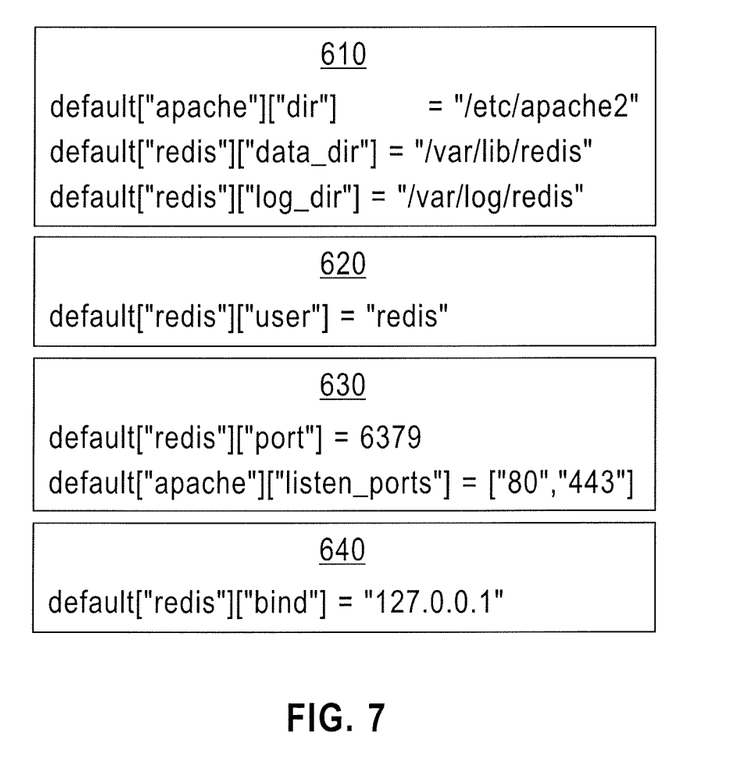
FIG. 7 illustrates examples of deployment code that may be parsed by the validator processing unit to generate validator codes.

FIG. 7 illustrates an example of sections 610-640 of a deployment code 410 that can be parsed by the parsing rules to determine the presence of the well-known components.

For example, parsing the first code section 610 using the directory parsing rule of FIG. 6 would determine the presence of three directories, namely "/etc/apach2", "var/lib/redis", and "var/log/redis". For example, the directory parsing rule could look for a keyword in the code section 610 between brackets such as "dir" or "_dir", advance to the next term in quotes, and then extract the corresponding term as one of the directories. The parser 420 may determine whether the term representative of the directory is in a format that is compatible with the target OS. For example, if the target OS is not compatible with forward slashes and the validator code discovers the presence of a forward slash in the term, it could produce a warning indicating that the directory has an improper format.

For example, parsing the second code section 620 using the user ID parsing rule of FIG. 6 would determine the presence of a single user with user ID "redis". For example, the user ID parsing rule could look for a keyword in the code section 620 between brackets such as "user", advance to the next term in quotes, and then extract the corresponding term as one of the user IDs.

For example, parsing the third code section 630 using the port parsing rule of FIG. 6 would determine the presence of three ports, namely 6379, 80, 443. For example, the port parsing rule could look for a keyword in the code section 630 between brackets such as "port" or "_port", advance to the next term that is a numerical value outside or inside of quotes, and then extract the corresponding term as one of the ports.

The port parsing rule or any of the parsing rules for that matter may interpret delimiters (e.g., ',', ';', ':') as representing the end of a term and possibly the beginning of a new term. For example, since there is a delimiter ',' after port 80, the port parsing rule can advance to a next numerical value after accounting a delimiter to extract another port (i.e., 443), and end its parsing of the current line upon encountering a special character (e.g., a newline character indicating a new line).

For example, the fourth code section 640 using the network address parsing rule of FIG. 6 would determine the presence of one network address, namely 127.0.0.1. For example, the network address parsing rule could look for a keyword in the deployment code between brackets such as "bind", advance to the next term in quotes, and extract the term as the corresponding network address. The parser 420 may determine whether the extracted term has the proper format of a network address by parsing the term for the presence of four numerical values delimited by periods, where these numerical values typically range from 0 to 255. If the term has the proper format of a network address, the corresponding validator code can be generated as discussed below.

While FIG. 6 shows only a single rule for each component, the inventive concept is not limited thereto, as each component may have multiple different rules associated with it. Further, there may be additional entries in the table 600 for other well-known components not listed herein.

Once the well-known components have been identified, the method includes the code generator 440 generating one or more validator code(s) 445 for the identified components (S502). The precise validator code may vary based on the operating system of the target system or the type of tools installed in the operating system such as CHEF, PUPPET, or ANSIBLE. If the target operating system cannot be inferred from the deployment code(s) 410, the validator processing unit 96 (e.g., the validator) can query a user to identify the target operating system. The validator may also store a list of identifiers of one or more target operating systems, so code can be generated for each target OS.

In an exemplary embodiment, the validator code 445 generated by the validator for a directory includes code that is designed to determine whether the term extracted by the parser 420 as a directory exists on the target system. For example, when a UNIX operating system is the target OS, the code generator 440 could generate a line of code of the validator code 445 using a command such as "if [-d dir_name] to determine whether a directory is present, where parameter dir_name is replaced with one of the extracted directory names (e.g., "/etc/apache2"). The validator code may output the result of the command to a variable or a log file that can later be checked to determine whether the directory is present. The validator code used to determine the presence of an extracted file or filename may be similar to the validator code used to determine the presence of an extracted directory or directory name.

The validator code for a directory or file may also include commands to check whether the permission state (e.g., read-only, execute only, etc.) on the directory or file match with an expected or required permission state. For example, if the file is an executable and it is not set to be executable on the target OS, the validator code can present a warning indicating that the deployed file has not been set to an executable state. For example, if the file needs to be writable (e.g., a log file), and the validator code determines that the file is set as a read-only file, it can present a warning indicating that the deployed file is not writable. For example, the warning may be presented on display 24.

In an exemplary embodiment, the validator code 445 for a user ID includes code that is designed to determine whether the term extracted by the parser 420 as a user ID exists on the target system. For example, the validator code may be designed to determine whether a user exists corresponding to the extracted user ID. For example, the validator code may include a command for parsing a password file (e.g., "/etc/passwd/") to determine whether the extracted user ID is located within the password file. For example, if the validator code concludes that the password file does not include the extracted user ID, it can be presumed that a user with the user ID does not exist on the target system. The validator code can then produce a warning to indicate that a needed user account has not been setup. For example, the warning may be presented on the display 24. However, since some user IDs are not part of the OS (i.e., not located in the password file), it could be a false alarm. Thus, the user may be required to verify whether the warning should be raised at all.

In an exemplary embodiment, the validator code for a port includes code that is designed to determine whether the term extracted by the parser 420 as a port or port number is currently active, being listened to, or being used by a process. For example, the validator code for the port may include a command (e.g., netstat-tupln) that is executed, where a result thereof is parsed to determine what ports are currently active, being listened to, or being used by a process. For example, the command can be designed to list all active connections and the TCP and UDP ports on which a given computer is listening. If a port with a particular port number needs to be left in-active (un-assigned) prior to the target system being configured with the deployment code, the validator code can present a warning if it determines that the port is currently assigned. Alternatively, if a port with a particular port number needs to be active (assigned) prior to the target system being configured with the deployment code, the validator code can present a warning if it determines that the port is currently in-active (un-assigned).

In an exemplary embodiment, the validator code for a network address includes code that is designed to determine whether the term extracted by the parser 420 as a network address is currently bound or addressable. For example, the validator code for the network address may include a command (e.g., ifconfig) that is executed, where a result thereof is parsed to determine what network addresses are currently bound or addressable. If a particular network address needs to be addressable prior to the target system being configured with the deployment code, the validator can present a warning if it determines the network address retrieved by the parser 420 is not addressable.

In an exemplary embodiment, the details of the validator codes depend on whether the validator codes are to be executed prior to deployment of the deployment code to the target system or after deployment of the deployment code to the target system. For example, where a port is identified as one of the well-known components 430 in a deployment code 410, the validator code includes code that raises an error when the port is already taken or in use and the validator code is to be executed before deployment of the deployment code 410 to the target machine, and the validator code includes code that raises an error when the port is non-existent and the validator code is to be executed after the deployment. Thus, the validator code may differ depending on whether it is used in pre-deployment checking or post-deployment checking. A user may be queried to indicate whether the deployment code is to be checked by the validator code with a pre-deployment or a post-deployment checking prior to generation of the validator code.

The validator code may additionally include code to perform basic system resource (e.g., storage space, network connectivity, memory size) checking. For example, if the amount of space or memory available on the target machine is too small to accommodate the deployment code, the validator code can raise an error.

The method of FIG. 5 further includes the order determining unit 450 determining the order the generated validator codes 445 are to be executed (S503). The order of execution may be determined at the time of generation of the validator codes for single component or a multi-component environment. The order of execution may be determined by leveraging an existing deployment. The order of the execution may depend on the time when the deployment code is run (e.g., post or pre-deployment). In an embodiment, the order the validator codes 445 are to be executed corresponds to the order the recipes in the deployment code are to be invoked. For example, if the deployment code 410 includes a first recipe (or script) followed by a second recipe (or script), where the first recipe includes code that references a port and the second recipe includes codes that reference a directory, then the validator code for the port would be executed before the validator code for the directory.

A validator code may be referred to as an environment agnostic validator, an environment specific validator, or a multi-component validator. The code of an environment agnostic validator does not require knowledge of the environment (e.g., target OS) the validator will be run on.

Validator code may be implemented as a function that expects to receive one or more parameters, where each parameter indicates which type of validation to perform. Validator code can be designed to run periodically or only upon certain events (e.g., reboot). In an embodiment, the computer server 12 or the validator processing unit 96 is referred to as a validator server, and is configured to distribute validator code(s) 445 to one or more target machines (e.g., target nodes), and remotely run the distributed validator codes. The validator codes 445 may also be configured to be run automatically by the target machines.

Ideally execution of validator code leaves no side effects on the target machine, is self-contained, can be run in a component process context (e.g., by a user), and is compatible with existing configuration management systems. For example, the validator code can be copied to unused directory (e.g., /tmp), which is then deleted after validation. In an embodiment, the validator code is self-contained since it does not rely on the existence of external libraries or software installation to run.

In an embodiment, the validator codes can be used to validate a steady-state operation. For example, a validation routine that executes various validator codes (e.g., check for existence/permission of files/directories, check whether ports assigned, check existence of user Ids, check for change in IP address, etc.) is run periodically at a regular interval to check for changes in state of the items checked by its validator codes. The validation routine may be embedded within a software timer (e.g., a software thread that runs in the background) that periodically invokes the validator codes 445 at the regular interval. Thus, the same validation routine runs over and over again, which raises an alarm when any of the checked parameters changes to a state that should raise the alarm (e.g., log file changes from writable to read-only, IP address changes to invalid IP address, etc.).

In embodiment, a model of the environment in which the deployment code is to be deployed is simulated, and the validator codes are run in the simulated environment to determine whether the validator codes are safe to run on the target system. The model of the deployment may be extracted from the validations and the deployment behavior.

Figure 8:
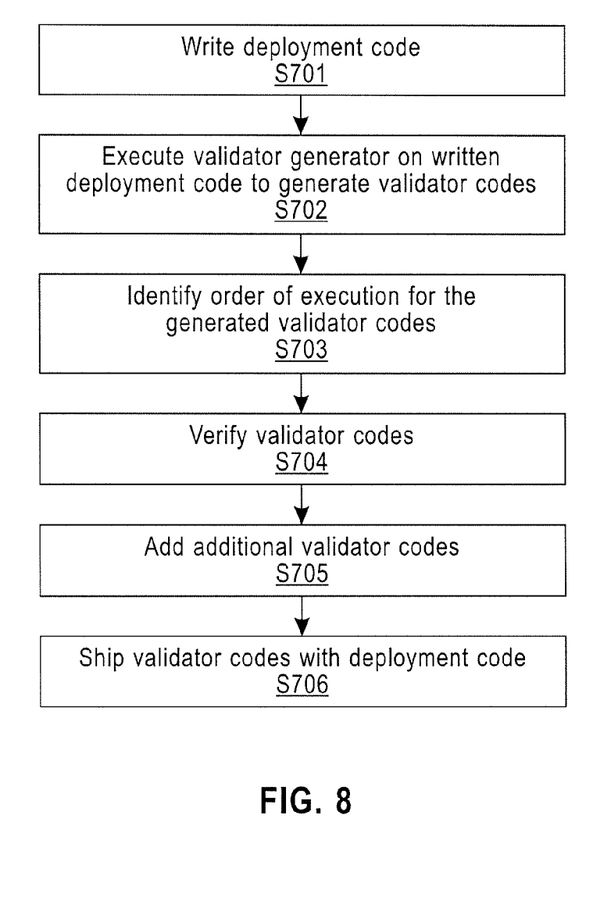
FIG. 8 illustrates a scenario that operates on deployment code according to an exemplary embodiment of the invention.

FIG. 8 illustrates a scenario that operates on deployment code according to an exemplary embodiment of the invention. Referring to FIG. 8, a method is performed that includes a developer writing deployment code in a chosen programming language (S701). For example, the deployment code could be code used for deploying or configuring a database server. The method includes a validator generator (e.g., 420, 440, and 450) being executed on the written deployment code to generate validator codes (S702). It is assumed in this scenario that the written deployment code is in a programming language that can be interpreted by the validator generator. The method further includes the validator generator identifying the order of execupon of the generated validator codes (S703). The method further includes verifying the validator codes (S704). In this embodiment, the developer that wrote the deployment code verifies the validator codes that were automatically generated by the validator generator. The method then includes the developer potentially adding additional validator code(s) not generated by the validator generator (S705). The method further includes sending the resulting validator codes and the deployment code to the target system (S706).

In an embodiment, the validator generator is only configured to interpret deployment code written in a first format (e.g., a first programming language). In this embodiment, the developer may write an interface in the validator generator that coverts deployment code written in a second other format (e.g., in a second programming language different from the first programming language) into the first format so that the validator generator can interpret the deployment code. In another embodiment, the developer may write an interface in the validator generator that enables the validator generator to interpret deployment code written in the second other format.

Figure 9:
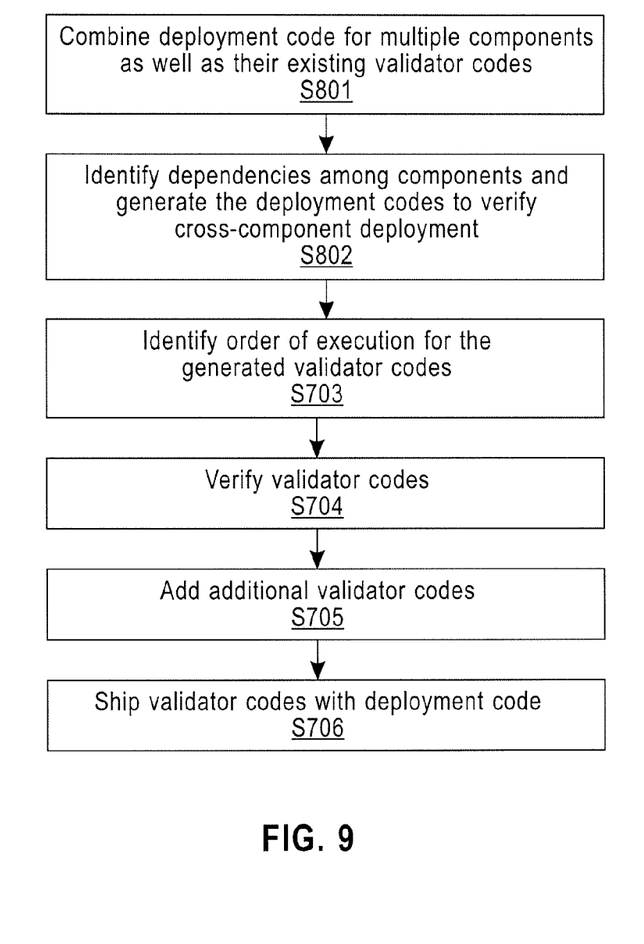
FIG. 9 illustrates a scenario that operates on deployment code according to an exemplary embodiment of the invention.

FIG. 9 illustrates a scenario that operates on deployment code according to an exemplary embodiment of the invention. Referring to FIG. 9, a method is performed that includes a developer combining deployment code for multiple components as well as their existing validator code (S801). For example, the multiple components could include a database server and a web server. For example, a single software install package could be created that includes the deployment code for the database server, the deployment code for the web server, and any existing validator codes for the database server and a web server. The method further includes (e.g., the validator generator) identifying dependencies among the components and generation of the deployment codes to verify cross-component deployment (S802). For example, if a first component (e.g., the web server) requires that certain other components (e.g., a particular file) be created by a second component (e.g., the database server) prior to the first component being run, a dependency of the first component on the second component is identified. An example of deployment code that checks the identified dependency would include code that provides a warning when these certain other components are not created prior to running of the first component. The method then continues through steps S703-S706 in a similar manner to that described above for FIG. 8.

Figure 10:
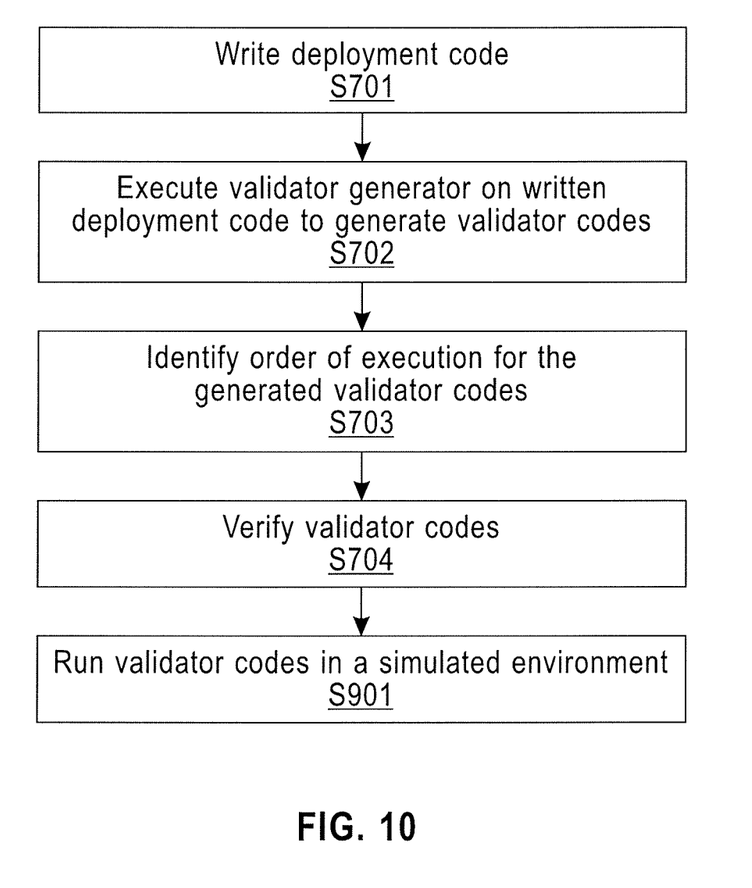
FIG. 10 illustrates a scenario that operates on deployment code according to an exemplary embodiment of the invention.

FIG. 10 illustrates a scenario that operates on deployment code according to an exemplary embodiment of the invention. FIG. 10 is similar to the scenario depicted in FIG. 8, except that step S706 is replaced with step S901, which runs the validator codes in a simulated setting or environment to verify the order of execution. The validator code may be configured to return a Boolean flag (e.g., a true or a false) when executed to indicate whether the code has successfully validated a particular aspect of one of the identified components.

The invention is not limited to the above described well-known components. For example, the table 600 may include additional components such as a password, where the corresponding parsing rule includes guidance on how to parse the deployment code 410 to extract the password, and the corresponding validator code validates whether the password is of a sufficient strength to satisfy the security requirements of the target system. For example, if the length of the password is lower than the requirements of the target system or the diversity of the characters used in the password fails to meet the password diversity requirements of the target system, the validator code may raise a warning when executed.

The units shown in FIG. 2 or 4 may be implemented by various manners, including software, hardware, firmware or a random combination thereof. For example, in some embodiments, the apparatus may be implemented by software and/or firmware. Alternatively or additionally, the system of FIG. 2 or FIG. 4 may be implemented partially or completely based on hardware. For example, one or more units in the system may be implemented as an integrated circuit (IC) chip, an application-specific integrated circuit (ASIC), a system on chip (SOC), a field programmable gate array (FPGA), etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A validation system configured to automatically generate validators for one or more target systems, the validation system comprising:
    a memory storing a computer process;
    a network interface configured to interface with the one or more target systems over a computer network; and
    a processor executing the computer process,
    wherein the computer process is configured to parse deployment code to identify components in the deployment code, generate validator code for each identified component, and use the network interface to transmit the validator codes to one or more of the target systems.

2. The validation system of claim 1, wherein to generate the validator code, the computer process generates the validator code by reading the corresponding deployment code through a domain or programming language specific interface.

3. The validation system of claim 1, wherein the process supports one or more language plug-ins.

4. The validation system of claim 1, wherein the validator code returns true or false.

5. The validation system of claim 1, wherein the validator code for a first one of the identified components is configured to make a network connection to another one of the identified components as part of cross component verification.

6. The validation system of claim 1, wherein the validator code is configured to be executed before or after the deployment code is deployed to one or more of the target systems.

7. The validation system of claim 1, wherein the process parses deployment code across multiple components and generates additional validator code based on dependencies identified between the multiple components.

8. The validation system of claim 1, wherein the process is configured to identify an order of execution of the validator codes.

9. The validation system of claim 1, where the process provides a mechanism to test the generated validator codes by executing them in a simulated environment.

10. The validation system of claim 1, wherein one of the identified components is a port, and the validator code includes an executable command that when executed provides an indication of whether the port is assigned or un-assigned.

11. The validation system of claim 10, wherein the command generates a warning when the port is assigned and the command is to be executed before the deployment code is deployed to the target system.

12. The validation system of claim 10, wherein the command generates a warning when the port is un-assigned and the command is to be executed after the deployment code is deployed to the target system.

13. The validation system of claim 1, wherein one of the identified components is a network address, and the validator code includes an executable command that when executed provides an indication of whether the address is addressable.

14. The validation system of claim 1, wherein one of the identified component is a file or directory, and the validator code includes an executable command that when executed provides an indication of whether the file or directory is at least one of readable, writeable, or executable.

15. The validation system of claim 1, wherein one of the identified components is a password, and the validator code for the password generates a warning when the password violates a security protocol of the target system.

16. The validation system of claim 1, wherein the process is configured remotely execute the transmitted validator codes.

17. A method of automatically generating validators for one or more target systems, the method comprising:
    parsing deployment code to identify components in the deployment code;
    generating validator code for each identified component;
    transmitting the generated validator codes to the one or more target systems; and
    executing the transmitted validator codes.

18. The method of claim 17, further comprising identifying an order of execution of the validator codes.

19. A computer program product for validating deployment code that is to be deployed on a target system, the computer program product comprising a computer readable storage medium having program code embodied therewith, the program code executable by a processor, to perform method steps comprising instructions for:
    parsing the deployment code to identify components in the deployment code;
    generating validator code for each identified component;
    transmitting the generated validator codes to the target system; and
    executing the transmitted validator codes.

20. The computer program product of claim 19, the method steps further comprising identifying an order of execution of the validator codes, wherein the executing occurs in the identified order.

* * * * *